Sept. 16, 1947.    A. H. DAVIDSON    2,427,445
AUTOMATIC DUAL TIRE EQUALIZER
Filed July 15, 1943    2 Sheets-Sheet 1
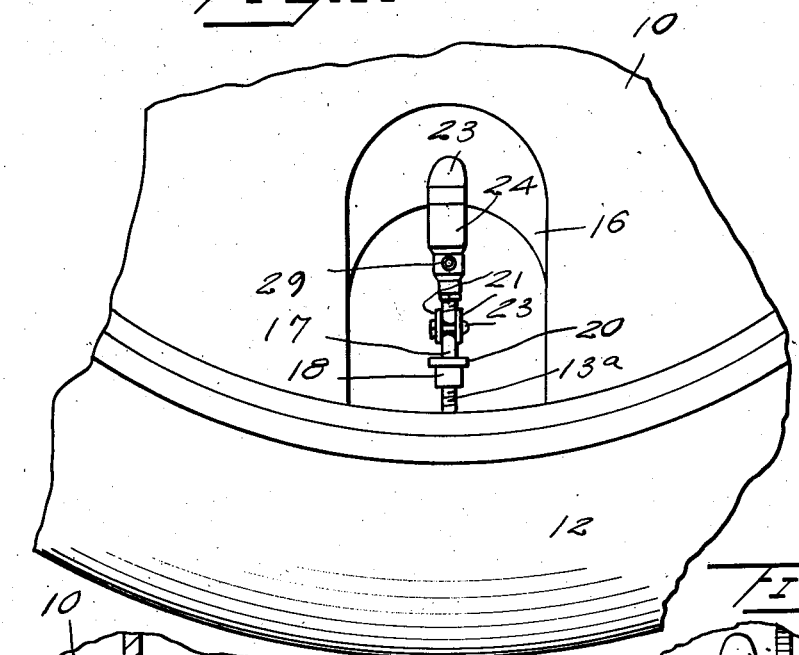
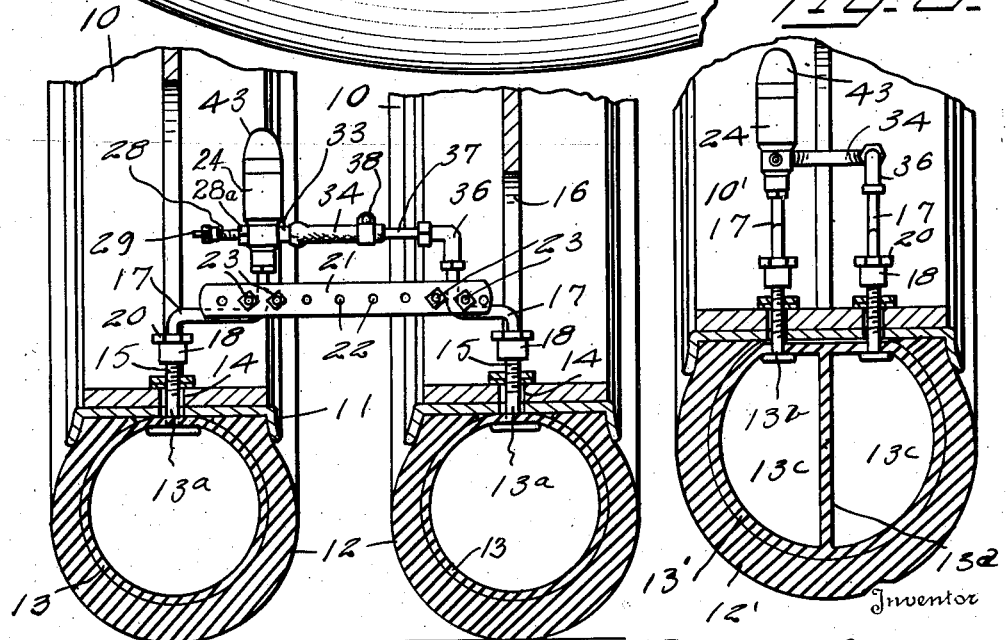
Inventor
A. H. Davidson
By L. F. Randolph
Attorney

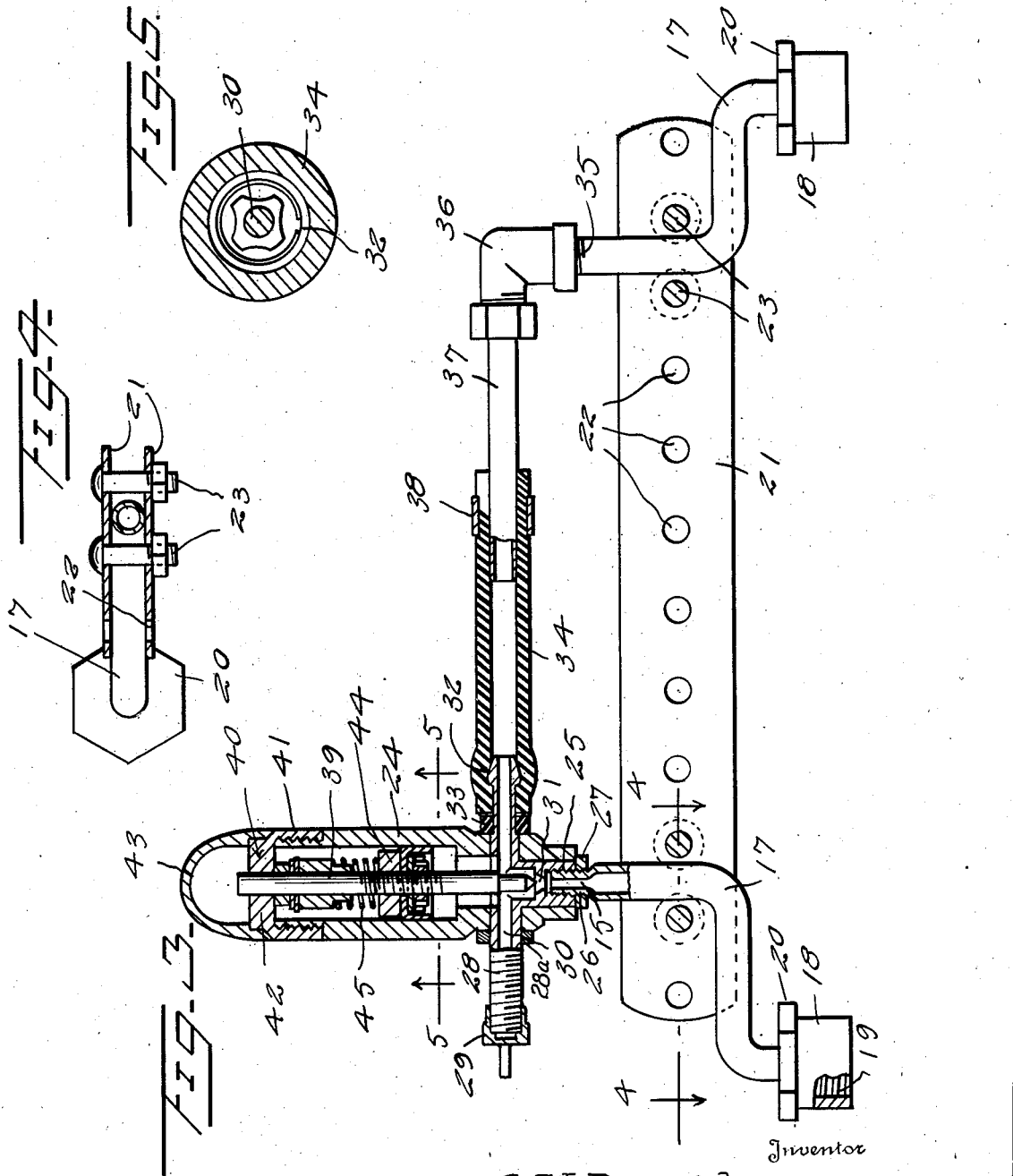

Patented Sept. 16, 1947

2,427,445

UNITED STATES PATENT OFFICE 2,427,445

AUTOMATIC DUAL TIRE EQUALIZER

Alf Harold Davidson, Eau Claire, Wis.

Application July 15, 1943, Serial No. 494,817

1 Claim. (Cl. 152—415)

This invention relates to a means to provide even or equal distribution of air pressure in a plurality of tires or in a plurality of air chambers when provided in the same tire, in order that each air chamber will carry the same load to attain longer wear for the tire.

It also is an object to be used in extreme weather conditions. That is the piston assembly which controls opening and closing of needle valve is operated in oil.

It also is an object to provide for the equal or even inflation of the plurality of tires or air chambers through the same pressure, to the end that equal brake power will be applied to the tires, giving greater stopping power as well as a saving of wear on the tires.

In addition, I aim to provide a structure whereby the inflation of the tires or chambers is from a point close to the outside tire or wheel in the case of dual tires, enabling simultaneous inflation of both tires or chambers, a structure wherein in the case of a blow-out the pressure nevertheless will be sustained in the other tire, and a construction whereby parts will be mounted in a novel manner with provision for novel adjustment under the various adaptations and circumstances of use; and further to provide a structure preferably having gauge means incorporated therein.

The more specific objects and advantages will become apparent from a consideration of the description following taken in connection with accompanying drawings illustrating an operative embodiment.

In said drawings:

Figure 1 is a view in elevation, fragmentarily showing a wheel and tire using my improvements;

Figure 2 is a view taken axially in section through dual wheels and tires; with my improvements applied and in elevation;

Figure 3 is an enlarged view of the improvements detached, with parts shown in section to disclose details;

Figure 4 is a detail section taken on the plane of line 4—4 of Figure 3;

Figure 5 is a cross section taken on the line 5—5 of Figure 3; and

Figure 6 is a view corresponding to Figure 2 taken through a modified form where a single tire has a tube equipped with a plurality of independent air chambers.

Referring specifically to the drawings wherein like reference characters designate like or similar parts, and first to the form of Figures 1 to 5, dual wheels are shown at 10 whose rims 11 accommodate the mountable tires or casings 12 within which are detachable inflatable tubes 13 equipped with tubular stems 13a projecting through the rims 11 at openings 14 and externally screw threaded as at 15. The wheels 10 are cut away as at 16 adjacent the stems 13a, to accommodate application, adjustment, and manipulation of the parts. All of the parts described are to be taken as conventional and merely representative of a combination or organization in connection with which my improvements are used.

Said stems 13a may be usual inflating stems for the tubes but at any rate they are tubular and preferably devoid of valves in their bores.

To attach my improvements I provide angular, generally L-shaped tubes or conduits at 17, each of which preferably has an integral or rigid nut 18 thereon attached by screw threads 19 internally thereof, to the stems 13a at 15. Such angular tubes 17 may have wrench-engaging heads 20 provided thereon as shown.

Since dual tires or wheels of the character shown will differ as to the distances they are located apart, the distances in which stems 13a are arranged, and the like, the angle tubes 17 may be secured at different distances apart and at different angles to adapt them to the conditions of use. As shown, I preferably use a pair of clamp plates 21, disposing them on opposite sides of the angle tubes. Such clamping plates or bars have a series of bolt holes 22 therein, through which detachable clamp bolts 23 are passed at selective locations.

Bars 21 preferably are arranged one on each side of the upper vertical portions of the angle tubes 17, and it will be noted that the outer bolts 23 are opposed to horizontal portions of such angle tubes, to minimize danger of displacement or undue radial movement of the clamping plates or bars.

To the stem 13a of the outermost tube or wheel I attach a casing 24 as by screw threading the same at 25 to the upper screw threaded end 26 of the angle tube, also preferably using a nut 27 for locking and anti-leaking purposes. Casing 24 at 28 at the outer side of the outer wheel has an inflating stem provided with an internal valve and which is of the same construction as the conventional tire inflation valve, the parts preferably being provided with the usual detachable screw-threaded caps 29. The casing 24 provides a T shaped passage 30 through the same, midway of the ends of which and below the line of inflation it is provided with a valve seat 31. Diametrically opposite the inflation tube 28, with the passage 30 extending therethrough, is an attaching head and extension 32. The parts constituting the valve stem 28 and extension 32, and providing the passage 30 may be made integral with the casing 24 or separate therefrom as preferred. When made separate and secured in the casing, a rubber spacer 33 preferably is disposed onto the extension 32. Said extension 32 is adapted to extend removably into and to dilate rubber or other flexible hose or conduit at 34 to form a sufficiently tight joint. The tube 28 is threaded and has a nut 28a thereon screwed tightly against the casing 24.

Attached to the screw-thread 35 at the upper end of the angle conduit 17 is a suitable elbow fitting 36 to the opposite end of which an extension conduit 37 is screw threaded or otherwise fastened. Such extension conduit 37 extends into the flexible conduit 34, thus providing an adjustable connection; and surrounding the hose 34 and part of tube 37 therein is a conventional clamp 38.

It thus will be seen that dual tires or tubes will be inflated at practically the same time, air pressure will have to be built up in passage 30, into tire 12, at the same time pressure is exerted on piston assembly 44 in which indicator rod 39 is located having its lower end in the form of needle fitting into valve seat 31 which shuts off air passage to tire 12, when sufficient pressure is exerted to release the needle from valve seat it allows free passage of air to tire 12. The spring tension on piston is set to conform with air pressure carried in tires. In case of blow-out this needle immediately reseats into valve seat shutting off the escape of air to prevent deflation of the tire. Reverting to the casing 24, I preferably form the upper portion thereof as a type of pressure gauge, the same being located adjacent to the outside of the wheel in order to be readily visible. This gauge includes a slidable indicator rod 39 guided in the body of the cap and in an end closure 40 therefor which preferably is screw threaded in place at 41. The rod 39 is calibrated if desired, and adapted to be viewed above the closure wall 42 through a dome 43. It will be understood that the body 24 and closure 40 may be made of any suitable material such as metal or plastic. However, I especially prefer to make the closure 40 of a transparent plastic material so that the indications of the element 39 through the dome readily can be observed. The indicator 39 normally is when under pressure disengaged from the valve seat 31, and it is of conventional gauge structure having attached thereto suitable piston means 44 within the valve casing associated with a coacting expansive spring at 45. Rod 39 serves for three purposes, upper end is pressure indicator, and the opposite end is shaped to fit in valve seat shutting off air passage from one tire to the other when air pressure drops below a foredetermined pressure, such as would happen if one tire blew out, and it also is threaded so as piston which is also threaded can be adjusted up or down to give the spring the proper tension, thereby regulating the sensitivity of the valve assembly to air pressure.

The same end and result may be attained where a single tube has dual chambers, as suggested in Figure 6. In this figure the inflatable tube is designated 13', being located within a tire casing 12' mounted on a wheel 10' at its rim as in the preceding form. Extending from the tube 13' are tubular stems 13b identical with those at 13a, each leading from a separate and independent air chamber 13c, provided by partitioning the tube 13' at 13d. Attached to the stems 13b are the angle tubes 17 as in the preceding form and which tubes mount the same parts as in the preceding form, and accordingly the same reference characters have been applied thereto. However, in the form of Figure 6, since the tubes 17 are relatively close together I may omit, as shown, the clamping plates 21 and bolts 23.

Various changes may be resorted to provided that they fall within the spirit and scope of the invention.

I claim as my invention:

In combination with tube means and tires providing a plurality of inflation chambers and stems communicating with said chambers, tubular fittings secured to said stems, means placing the fittings in communication with each other, and inflating means for the last-mentioned means, and clamp means engaging and holding said fittings against turning relatively to each other, comprising a pair of plates, bolt means connecting the plates together and to the fittings, said fittings having portions angularly arranged and extending toward each other and disposed in the direction of possible slippage of the bolt means.

ALF HAROLD DAVIDSON.

REFERENCES CITED

The following references are of record in the file of this patent:

UNITED STATES PATENTS

| Number | Name | Date |
|---|---|---|
| 1,312,457 | Schwinert | Aug. 5, 1919 |
| 1,404,754 | Gammeter | Jan. 31, 1922 |
| 1,513,740 | Brown | Nov. 4, 1924 |
| 2,251,713 | Meiser | Aug. 5, 1941 |
| 1,870,484 | Basta | Aug. 9, 1932 |